(12) United States Patent
Matsuoka et al.

(10) Patent No.: US 12,110,364 B2
(45) Date of Patent: Oct. 8, 2024

(54) POLY(ARYLENE ETHER KETONE) RESIN, METHOD FOR PRODUCING THE SAME, AND MOLDED ARTICLE

(71) Applicant: DIC Corporation, Tokyo (JP)

(72) Inventors: Ryuichi Matsuoka, Sakura (JP); Masaya Masumoto, Sakura (JP); Katsuya Maeyama, Yonezawa (JP)

(73) Assignee: DIC Corporation, Tokyo (JP)

( * ) Notice: Subject to any disclaimer, the term of this patent is extended or adjusted under 35 U.S.C. 154(b) by 667 days.

(21) Appl. No.: 17/414,591

(22) PCT Filed: Dec. 5, 2019

(86) PCT No.: PCT/JP2019/047632
§ 371 (c)(1),
(2) Date: Jun. 16, 2021

(87) PCT Pub. No.: WO2020/137420
PCT Pub. Date: Jul. 2, 2020

(65) Prior Publication Data
US 2022/0056210 A1    Feb. 24, 2022

(30) Foreign Application Priority Data

Dec. 25, 2018 (JP) ................. 2018-241642

(51) Int. Cl.
*C08K 7/02* (2006.01)
*C08G 65/40* (2006.01)

(52) U.S. Cl.
CPC ..... *C08G 65/4056* (2013.01); *C08G 65/4087* (2013.01); *C08G 65/4093* (2013.01); *C08K 7/02* (2013.01); *C08G 2650/40* (2013.01)

(58) Field of Classification Search
USPC ........................................ 528/125
See application file for complete search history.

(56) References Cited

U.S. PATENT DOCUMENTS

| | | | |
|---|---|---|---|
| 3,065,205 A | 11/1962 | Willard, Jr. | |
| 3,953,400 A | 4/1976 | Dahl | |
| 4,320,224 A | 3/1982 | Rose et al. | |
| 5,155,203 A | 10/1992 | Darnell et al. | |
| 6,566,484 B2 | 5/2003 | Gharda et al. | |
| 2021/0171710 A1 | 6/2021 | Matsuoka et al. | |

FOREIGN PATENT DOCUMENTS

| | | |
|---|---|---|
| CN | 103709379 A | 4/2014 |
| CN | 111511803 A | 8/2020 |
| EP | 1473314 A1 | 11/2004 |
| JP | S61-247731 A | 11/1986 |
| WO | 2019/142942 A1 | 7/2019 |

OTHER PUBLICATIONS

Office Action dated Oct. 20, 2022, issued for the corresponding China patent application No. 201980076692.9 and English translation thereof.
M. Ueda et al., "Synthesis of Aromatic Poly (ether ketones)," Macromolecules, 1987, 20, pp. 2675-2678. (cited in the ISR).
M. Ueda et al., "Synthesis of polyketones by direct polycondensation of dicarboxylic acids with diaryl compounds using phosphorus pentoxide/methanesulfonic acid as condensing agent and solvent," Makromol. Chem., Rapid Commun., 5, 1985, pp. 833-836. (cited in the ISR).

*Primary Examiner* — Terressa Boykin
(74) *Attorney, Agent, or Firm* — Locke Lord LLP; James E. Armstrong, IV; Nicholas J. DiCeglie, Jr.

(57) ABSTRACT

Provided is a poly(arylene ether ketone) resin which inhibits reactions such as molecular weight extension and crosslinking in a high-temperature molten state and which is excellent in melt viscosity stability and molding processability. The poly(arylene ether ketone) resin contains an alkylsulfonyl group represented by general formula (1). In the formula, R is an alkyl group containing one to four carbon atoms.

17 Claims, No Drawings

POLY(ARYLENE ETHER KETONE) RESIN, METHOD FOR PRODUCING THE SAME, AND MOLDED ARTICLE

TECHNICAL FIELD

The present invention relates to a poly(arylene ether ketone) resin, a method for producing the same, and a molded article containing the poly(arylene ether ketone) resin.

BACKGROUND ART

A poly(arylene ether ketone) resin (hereinafter abbreviated as "PAEK resin" in some cases) is excellent in heat resistance, chemical resistance, toughness, and the like and is widely used as a crystalline super engineering plastic capable of being continuously used at high temperature in electric/electronic components, automotive components, medical components, fibers, film applications, and the like.

Hitherto, the following resin has been well known as a PAEK resin: a poly(ether ether ketone) resin (hereinafter abbreviated as "PEEK resin" in some cases) which is produced by the aromatic nucleophilic substitution-type solution polycondensation reaction of two monomers, 4,4'-difluorobenzophenone and hydroquinone, in diphenyl sulfone using potassium carbonate (refer to, for example, Patent Literature 1) and which contains two ether groups and a ketone group in a repeating unit.

There is a poly(ether ketone) resin (hereinafter abbreviated as "PEK resin" in some cases) which is produced using 4,4'-dihydroxybenzophenone instead of hydroquinone and which contains an ether group and a ketone group in a repeating unit.

However, the aromatic nucleophilic substitution-type solution polycondensation reaction has a disadvantage that the raw material cost is high because a monomer used is 4,4'-difluorobenzophenone, which is expensive, and the production process cost is also high because the reaction temperature is 300° C. or higher. Therefore, the price of resin tends to be high.

Therefore, the following reaction is known: an aromatic electrophilic substitution-type solution polycondensation reaction for producing a PAEK resin under mild polymerization conditions without using 4,4'-difluorobenzophenone as a monomer.

Examples in which the aromatic electrophilic substitution-type solution polycondensation reaction is used include a poly(ether ketone) resin produced by a method for allowing 4-phenoxybenzoic acid chloride to react in the presence of hydrogen fluoride-boron trifluoride (refer to, for example, Patent Literature 2), a poly(ether ketone ketone) resin produced by a method for allowing terephthalic acid chloride to react with diphenyl ether in the presence of a Lewis acid (refer to, for example, Patent Literature 3), and a poly(ether ketone) resin produced by a method for allowing 4-phenoxybenzoic acid to react in the presence of a mixture of methanesulfonic acid and phosphorus pentoxide (refer to, for example, Patent Literature 4).

In order to obtain a poly(ether ether ketone) resin which excludes a reactive end group such as a carboxy group and which can be melt-molded, a poly(ether ether ketone) resin having a novel end group structure has been proposed (refer to, for example, Patent Literature 5).

CITATION LIST

Patent Literature

PTL 1: U.S. Pat. No. 4,320,224
PTL 2: U.S. Pat. No. 3,953,400
PTL 3: U.S. Pat. No. 3,065,205
PTL 4: Japanese Unexamined Patent Application Publication No. 61-247731
PTL 5: U.S. Pat. No. 6,566,484

SUMMARY OF INVENTION

Technical Problem

The above-mentioned conventional PEEK resin, PEK resin, and the like are partially crystalline polymers; the glass transition temperature thereof is high, 140° C. or higher; the heat resistance thereof is excellent; but the crystalline melting point thereof is also high, 340° C. or higher; and a temperature of 390° C. or higher is necessary as a molding temperature.

In conventional resins, reactive end groups and the like induce a chemical reaction in such a high-temperature molten state to cause molecular weight extension or crosslinking and also induce gelation to vary the melt viscosity. Therefore, the conventional resins have a disadvantage that molding is difficult.

Though Patent Literature 5 has an object to exclude a reactive end group, the poly(ether ether ketone) resin described in Patent Literature 5 is not fully satisfactory from the viewpoint of providing resin which is excellent in melt viscosity stability in a high-temperature molten state and which has good molding processability. The poly(ether ether ketone) resin has room for improvement.

Accordingly, it is an object of the present invention to provide a poly(arylene ether ketone) resin which inhibits reactions such as molecular weight extension and crosslinking in a high-temperature molten state and which is excellent in melt viscosity stability and molding processability.

Solution to Problem

The inventors have performed intensive investigations to solve the above problem and, as a result, have found that a poly(arylene ether ketone) resin having an alkylsulfonyl group bonded thereto can solve the above problem, leading to the completion of the present invention.

That is, the present invention encompasses aspects below.

[1] A poly(arylene ether ketone) resin contains an alkylsulfonyl group represented by general formula (1) below.

[Chem. 1]

(where R is an alkyl group containing one to four carbon atoms).

[2] In the poly(arylene ether ketone) resin specified in Item [1], the alkylsulfonyl group represented by general formula (1) is bonded to a terminal site of the poly(arylene ether ketone) resin and has a terminal structure represented by general formula (1A) below:

[Chem. 2]

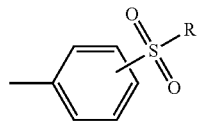
(1A)

(where R is an alkyl group containing one to four carbon atoms).

[3] In the poly(arylene ether ketone) resin specified in Item [1] or [2], the concentration of the alkylsulfonyl group represented by general formula (1) in the poly(arylene ether ketone) resin is 0.3 mmol/kg to 2,000 mmol/kg.

[4] The poly(arylene ether ketone) resin specified in Item [1], having a main chain structure represented by general formula (2) below:

[Chem. 3]

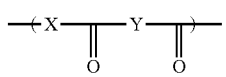
(2)

where X is represented by general formula (3-1) below and Y is represented by general formula (4-1) below:

[Chem. 4]

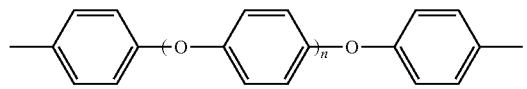
(3-1)

(where n represents 0 to 2), and

[Chem. 5]

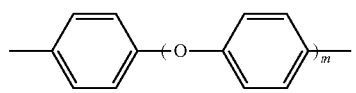
(4-1)

(where m represents 0 to 3).

[5] A method for producing a poly(arylene ether ketone) resin containing an alkylsulfonyl group represented by general formula (1) below includes either (i) a reaction step of allowing a monomer represented by general formula (3-2) below and a monomer represented by the general formula (4-2) below to react in the presence of a mixture of an organic sulfonic acid and phosphorus pentoxide or (ii) a reaction step of allowing a poly(arylene ether ketone) resin containing no alkylsulfonyl group to react in the presence of a mixture of an organic sulfonic acid and phosphorus pentoxide:

[Chem. 6]

(1)

(where R is an alkyl group containing one to four carbon atoms),

[Chem. 7]

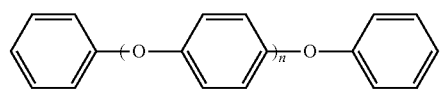
(3-2)

(where n represents 0 to 2), and

[Chem. 8]

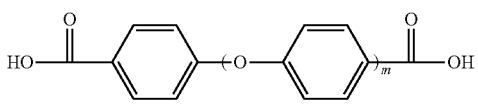
(4-2)

(where m represents 0 to 3).

[6] In the method for producing the poly(arylene ether ketone) resin specified in Item [5], the reaction step (ii) is a reaction step of allowing the monomer represented by general formula (3-2) to react with isophthaloyl chloride and terephthaloyl chloride in the presence of a Lewis acid catalyst to obtain a poly(arylene ether ketone) resin (B) and allowing the poly(arylene ether ketone) resin (B) to react in the presence of a mixture of an organic sulfonic acid and phosphorus pentoxide.

[7] A resin composition contains the poly(arylene ether ketone) resin specified in any one of Items [1] to [4].

[8] The resin composition specified in Item [7] further contains a fiber.

[9] A molded article is made by molding the resin composition specified in Item [7] or [8].

Advantageous Effects of Invention

According to the present invention, the following resin can be provided: a poly(arylene ether ketone) resin which inhibits reactions such as molecular weight extension and crosslinking in a high-temperature molten state and which is excellent in melt viscosity stability and molding processability.

DESCRIPTION OF EMBODIMENTS (Poly(Arylene Ether Ketone) Resin (PAEK Resin))

A poly(arylene ether ketone) resin according to the present invention contains an alkylsulfonyl group represented by general formula (1) below.

[Chem. 9]

(1)

(where R is an alkyl group containing one to four carbon atoms).

The inventors have investigated PAEK resins excellent in melt viscosity stability in a high-temperature molten state. As a result, the following has been found.

When the PAEK resins are kept in a high-temperature molten state for a long time, a phenyl group of a terminal structure reacts with a ketone group of a main chain structure, so that crosslinking proceeds.

In particular, when a metal component, such as sodium, potassium, or aluminium, serving as a reaction catalyst for polymerization and a strong acid component such as methanesulfonic acid remains, they exhibit catalysis to allow a crosslinking reaction to proceed and finally cause gelation in some cases.

Therefore, in order to prevent the gelation of the PAEK resins at high temperature, the inventors have further investigated the PAEK resins.

As a result, the inventors have found that when a substituent R' represented by general formula (a) below is attached to a phenyl group of a terminal structure of a PAEK resin, the likelihood of a crosslinking reaction varies depending on the type of R'.

[Chem. 10]

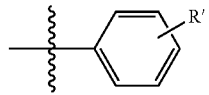
(a)

When R' is an electron-donating group such as a methyl group (CH$_3$) or a methoxy group (CH$_3$O), the electron density of an aromatic ring is high and the reactivity is high; hence, the crosslinking reaction is likely to occur.

When R' is a halogen such as fluorine or chlorine, the aromatic ring is deactivated to a certain extent, which is insufficient to prevent the crosslinking reaction.

However, when R' is an electron-withdrawing group such as the alkylsulfonyl group represented by general formula (1), particularly a methanesulfonyl group (CH$_3$SO$_2$), the aromatic ring is deactivated and no crosslinking reaction occurs.

The inventors have confirmed that a PAEK resin containing an alkylsulfonyl group such as a methanesulfonyl group can inhibit reaction such as crosslinking in resin in a high-temperature molten state and is resin excellent in melt viscosity stability.

In general formula (1), R is not particularly limited, may be an alkyl group containing one to four carbon atoms, and can be appropriately selected depending on purposes. In general formula (1), R is preferably an alkyl group containing one, two, or four carbon atoms; more preferably an alkyl group containing one or two carbon atoms, and further more preferably an alkyl group containing one carbon atom.

The alkylsulfonyl group represented by general formula (1) is preferably bonded to a terminal site of the poly(arylene ether ketone) resin from the viewpoint of inhibiting the reaction of a terminal benzene ring. That is, the poly(arylene ether ketone) resin according to the present invention preferably has a terminal structure represented by general formula (1A) below.

[Chem. 11]

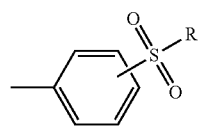
(1A)

(where R is an alkyl group containing one to four carbon atoms).

The poly(arylene ether ketone) resin according to the present invention preferably has a main chain structure represented by general formula (2) below.

[Chem. 12]

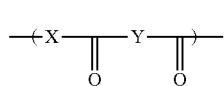
(2)

where X is represented by general formula (3-1) below and Y is represented by general formula (4-1) below.

[Chem. 13]

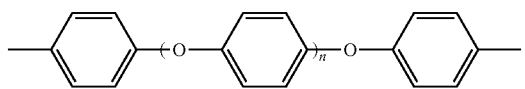
(3-1)

(where n represents 0 to 2).

[Chem. 14]

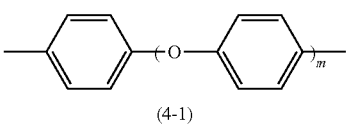
(4-1)

(where m represents 0 to 3).

In general formula (4-1), m is more preferably 0 or 1.

The PAEK resin according to the present invention is such that a portion of the PAEK resin is alkylsulfonated. This enables the PAEK resin according to the present invention to inhibit reaction such as crosslinking in resin in a high-temperature molten state and allows the PAEK resin to be resin excellent in melt viscosity stability.

As a more preferable model of the PAEK resin according to the present invention, resin in which the alkylsulfonyl group is bonded to a terminal site of the PAEK resin is cited as described above.

When the concentration of the alkylsulfonyl group represented by general formula (1) in the PAEK resin according to the present invention is 0.3 mmol/kg or more, the alkylsulfonyl group can be bonded to a terminal benzene ring and the reaction of the terminal benzene ring can be effectively prevented. The concentration thereof is preferably 0.5 mmol/kg or more from the viewpoint of obtaining resin more excellent in melt viscosity stability. Thus, the concentration of the alkylsulfonyl group represented by general formula (1) in the PAEK resin according to the present invention is preferably 0.3 mmol/kg or more, more preferably 0.5 mmol/kg or more, further more preferably 0.8 mmol/kg or more, and particularly preferably 1 mmol/kg or more.

On the other hand, when the concentration of the alkylsulfonyl group represented by general formula (1) in the PAEK resin according to the present invention is 2,000 mmol/kg or less, many alkylsulfonyl groups represented by general formula (1) are bonded to terminal sites of the PAEK resin or a main chain structure other than the terminal sites and therefore a problem that the uniformity of the molecular weight or molecules for ensuring dynamic physical properties as a molding material is lost can be effectively prevented. The concentration thereof is preferably 1,200 mmol/kg or less from the viewpoint of preventing the reduction of the mechanical strength of molding due to excessively low melt viscosity. Thus, the concentration of the alkylsulfonyl group represented by general formula (1) in the PAEK resin according to the present invention is preferably 2,000 mmol/kg or less, more preferably 1,200 mmol/kg or less, and further more preferably 800 mmol/kg or less.

From the above, the concentration of the alkylsulfonyl group represented by general formula (1) in the PAEK resin according to the present invention is preferably 0.3 mmol/kg to 2,000 mmol/kg, more preferably 0.5 mmol/kg to 1,200 mmol/kg, further more preferably 0.8 mmol/kg to 800 mmol/kg, and particularly preferably 1 mmol/kg to 800 mmol/kg.

Controlling the concentration of the alkylsulfonyl group represented by general formula (1) in the resin enables the stability of the resin in a molten state to be improved and enables the molding processability to be enhanced.

The PAEK resin according to the present invention preferably exhibits physical properties below from the viewpoint of heat resistance and molding processability.

The glass transition temperature (Tg) of the PAEK resin according to the present invention is preferably, for example, 120° C. to 170° C. and more preferably 130° C. to 160° C.

The crystalline melting point (Tm) of the PAEK resin according to the present invention is preferably, for example, 260° C. to 400° C. and more preferably 270° C. to 390° C.

In the PAEK resin according to the present invention, the 5% weight loss temperature (Td5), which is one of indexes of heat resistance as described in an example below, is preferably, for example, 500° C. to 560° C.; more preferably 530° C. to 550° C.; and further more preferably 540° C. to 550° C.

In the PAEK resin according to the present invention, the melt viscosity, which is one of indexes of the strength of a molded article as described in an example below, is preferably, for example, 10 Pa·s to 2,000 Pa·s; more preferably 100 Pa·s to 1,500 Pa·s; and further more preferably 150 Pa·s to 1,000 Pa·s.

Furthermore, in the PAEK resin according to the present invention, the thickening ratio, which is one of indexes of melt viscosity stability as described in an example below, is preferably, for example, 2 or less; more preferably 1.2 or less; and further more preferably 1.1 or less. When the thickening ratio is 2 or less, resin which is excellent in molding processability and which is effective in practical use can be obtained.

A method for producing the poly(arylene ether ketone) resin according to the present invention such that the alkylsulfonyl group represented by general formula (1) is bonded to the poly(arylene ether ketone) resin is described below in detail.

(Method for Producing Poly(Arylene Ether Ketone) Resin (PAEK Resin))

The method for producing the poly(arylene ether ketone) resin according to the present invention is not particularly limited and can be appropriately selected depending on purposes. The poly(arylene ether ketone) resin according to the present invention can be produce by a production method including, for example, a reaction step specified in Item (i) or (ii) below.

As a first embodiment of the method for producing the poly(arylene ether ketone) resin according to the present invention, the following method is cited: a method for producing a poly(arylene ether ketone) resin, the method including (i) a reaction step of allowing a monomer represented by general formula (3-2) below and a monomer represented by general formula (4-2) below to react in the presence of a mixture of an organic sulfonic acid and phosphorus pentoxide.

As a second embodiment of the method for producing the poly(arylene ether ketone) resin according to the present invention, the following method is cited: a method for producing a poly(arylene ether ketone) resin, the method including (ii) a reaction step of allowing a poly(arylene ether ketone) resin containing no alkylsulfonyl group to react in the presence of a mixture of the organic sulfonic acid and phosphorus pentoxide.

[Chem. 15]

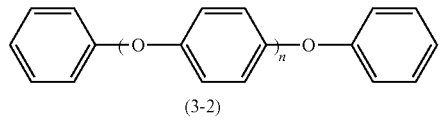

(3-2)

(where n represents 0 to 2).

[Chem. 16]

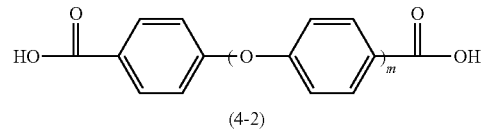

(4-2)

(where m represents 0 to 3).

A method for producing the poly(arylene ether ketone) resin containing no alkylsulfonyl group specified in Item (ii) is not particularly limited. A method for producing a poly(arylene ether ketone) resin usually used is cited. The following methods are cited: for example, a method for producing a poly(arylene ether ketone) resin by an aromatic nucleophilic substitution reaction, a method for producing a poly(arylene ether ketone) resin using a Lewis acid catalyst, and the like.

As a more preferable embodiment of the production method specified in Item (ii), the following method is cited: for example, (ii-1) a method for producing a poly(arylene ether ketone) resin, the method including a reaction step of allowing the monomer represented by general formula (3-2)

to react in the presence of a Lewis acid catalyst to obtain a poly(arylene ether ketone) resin (B) and allowing the poly(arylene ether ketone) resin (B) to react in the presence of a mixture of the organic sulfonic acid and phosphorus pentoxide.

The method for producing the poly(arylene ether ketone) resin according to the present invention is an aromatic electrophilic substitution-type solution polycondensation reaction and therefore reaction can be carried out under mild polymerization conditions.

Examples of the monomer represented by general formula (3-2) include diphenyl ether (n=0), 1,4-diphenoxybenzene (n=1), and 4,4'-oxybis(phenoxybenzene) (n=2).

Examples of the monomer represented by general formula (4-2) include terephthalic acid (m=0), 4,4'-oxybis(benzoic acid) (m=1), 1,4-bis(4-carboxyphenoxy)benzene (m=2), and 4,4'-bis(p-carboxyphenoxy)diphenyl ether (m=3).

In the method for producing the PAEK resin according to the present invention, other monomers such as another ether group-containing aromatic monomer and a carboxylic acid monomer can be used in combination in addition to an ether group-containing aromatic monomer represented by general formula (3-2) and a carboxylic acid monomer represented by general formula (4-2) in a range where an effect of the PAEK resin according to the present invention is maintained. Examples of the other monomers include isophthalic acid, 5-methylisophthalic acid, 2-methylisophthalic acid, 4-methylisophthalic acid, 5-ethylisophthalic acid, 2-ethylisophthalic acid, 4-ethylisophthalic acid, 5-propylisophthalic acid, 2-propylisophthalic acid, 4-propylisophthalic acid, 5-butylisophthalic acid, 2-butylisophthalic acid, 4-butylisophthalic acid, diphenic acid, 2,2'-biphenyldicarboxylic acid, 6,6'-dimethyl biphenyl-2,2'-dicarboxylic acid, and the like.

The organic sulfonic acid is not particularly limited and can be appropriately selected depending on purposes. Examples of the organic sulfonic acid include aliphatic sulfonic acids and aromatic sulfonic acids. An aliphatic sulfonic acid is particularly preferable. In particular, examples of organic sulfonic acid include methanesulfonic acid, ethanesulfonic acid, trifluoromethanesulfonic acid, benzenesulfonic acid, p-toluenesulfonic acid (tosic acid), and the like.

The ratio of the loading of the organic sulfonic acid to the loading of phosphorus pentoxide is not particularly limited and can be appropriately selected depending on purposes. The ratio thereof is preferably in the range of, for example, 100:25 to 100:1; more preferably 100:20 to 100:2; and further more preferably 100:15 to 100:5 on a mass basis.

The production method of the first embodiment is described below in detail.

In the production method of the first embodiment, the ratio of the loading of the monomer represented by general formula (3-2) to the loading of the monomer represented by general formula (4-2) is not particularly limited, can be appropriately selected depending on purposes, and is preferably, for example, a ratio below. When, among reaction components, the ether group-containing aromatic monomer includes another ether group-containing aromatic monomer other than the monomer represented by general formula (3-2), the ratio below is based on the sum of the amounts of all aromatic monomers including the monomer represented by general formula (3-2). When, among reaction components, the carboxylic acid monomer includes another carboxylic acid monomer other than the monomer represented by general formula (4-2), the ratio below is based on the sum of the amounts of all carboxylic acid monomers including the monomer represented by general formula (4-2). That is, the ratio "ether group-containing aromatic monomer (including the monomer represented by general formula (3-2))/carboxylic acid monomer (including the monomer represented by general formula (4-2))" is preferably 0.8 to 1.2, more preferably 0.9 to 1.1, and further more preferably 1.0 to 1.1 on a molar basis.

When the ratio "aromatic monomer/carboxylic acid monomer" is 0.8 or more, a problem caused by the increase in percentage of the carboxylic acid monomer, that is, a problem that a carboxy group is present in a polymer terminal structure, a decarboxylation reaction is caused by the carboxy group during molding to generate gas, and voids occur in a molded article can be effectively prevented. On the other hand, when the ratio "aromatic monomer/carboxylic acid monomer" is 1.2 or less, a PAEK resin with molecular weight sufficient in practical use can be obtained.

The ratio of the sum of the loadings of the monomer represented by general formula (3-2) and the monomer represented by general formula (4-2) to the sum of the loadings of the organic sulfonic acid and phosphorus pentoxide is not particularly limited and can be appropriately selected depending on purposes. The ratio thereof is preferably in the range of, for example, 1:100 to 40:100; more preferably 2:100 to 30:100; and further more preferably 5:100 to 20:100 on a mass basis.

The amounts of components such as the organic sulfonic acid and phosphorus pentoxide, the ratio thereof, the amounts of monomers such as the monomer represented by general formula (3-2) and the monomer represented by general formula (4-2), the ratio thereof, the ratio of the sum of the loadings of the monomer represented by general formula (3-2) and the monomer represented by general formula (4-2) to the sum of the loadings of the organic sulfonic acid and phosphorus pentoxide, reaction conditions (the reaction temperature, the reaction time, and the like) for producing the poly(arylene ether ketone) resin, or the like are not particularly limited and may be appropriately set such that the concentration of the alkylsulfonyl group in the poly(arylene ether ketone) resin is in a preferable range.

The concentration of the alkylsulfonyl group represented by general formula (1) in the PAEK resin can be adjusted to a preferable range in such a manner that, for example, the ratio of the sum of the loadings of the organic sulfonic acid and phosphorus pentoxide to the sum of the loadings of the monomer represented by general formula (3-2) and the monomer represented by general formula (4-2) is set higher or the reaction temperature and reaction time for producing the PAEK resin in the presence of a mixture of the organic sulfonic acid and phosphorus pentoxide is sufficiently ensured.

In, for example, the production method of the first embodiment, the alkylsulfonyl group can be introduced into the PAEK resin in such a manner that the monomer represented by general formula (3-2) and the monomer represented by general formula (4-2) are allowed to react in the presence of a mixture of the organic sulfonic acid and phosphorus pentoxide at 50° C. to 120° C. for one hour to 120 hours.

In, for example, the production method of the first embodiment, the PAEK resin may be produced in such a manner that when the monomer represented by general formula (3-2) and the monomer represented by general formula (4-2) are allowed to react in the presence of a mixture of the organic sulfonic acid and phosphorus pentoxide, conditions such as the reaction temperature and/or the reaction time are varied and a reaction step is divided into two stages.

In particular, as a more preferable embodiment of the production method of the first embodiment, a production method specified in Item (i-1) below and a production method specified in Item (i-2) below can be cited.

(i-1) A method for producing the poly(arylene ether ketone) resin according to the present invention in such a manner that the monomer represented by general formula (3-2) and the monomer represented by general formula (4-2) are added and are allowed to react in the presence of a mixture of the organic sulfonic acid and phosphorus pentoxide at a temperature of 50° C. to 70° C. for 30 hours to 100 hours.

(i-2) A method for producing the poly(arylene ether ketone) resin according to the present invention in such a manner that the monomer represented by general formula (3-2) and the monomer represented by general formula (4-2) are added, are allowed to react in the presence of a mixture of the organic sulfonic acid and phosphorus pentoxide at a temperature of 50° C. to 70° C. for one hour to 30 hours (a first stage reaction step), and are then allowed to react at a temperature of 70° C. to 120° C. for one hour to ten hours (a second stage reaction step).

According to the production methods specified in Items (i-1) and (i-2), the amount of the alkylsulfonyl group, represented by general formula (1), introduced into the PAEK resin can be set to a preferable range.

In particular, the production method specified in Item (i-2) is preferable because the rate of introducing the alkylsulfonyl group into the PAEK resin is readily controlled and the PAEK resin can be produced at low cost.

Next, the production method of the second embodiment is described below in detail.

As the second embodiment of the method for producing the poly(arylene ether ketone) resin according to the present invention, the following method is cited: the method for producing the poly(arylene ether ketone) resin, the method including (ii) the reaction step of allowing the poly(arylene ether ketone) resin containing no alkylsulfonyl group to react in the presence of a mixture of the organic sulfonic acid and phosphorus pentoxide as described above.

A method for producing the poly(arylene ether ketone) resin containing no alkylsulfonyl group is not particularly limited. The method for producing the usual poly(arylene ether ketone) resin can be used as described above. In particular, a method for producing the poly(arylene ether ketone) resin using a Lewis acid catalyst is preferably cited.

As a more preferable embodiment of the production method specified in Item (ii), the following method is cited: for example, (ii-1) the method for producing the poly (arylene ether ketone) resin, the method including the reaction step of allowing the monomer represented by general formula (3-2) to react in the presence of the Lewis acid catalyst to obtain the poly(arylene ether ketone) resin (B) and allowing the poly(arylene ether ketone) resin (B) to react in the presence of a mixture of the organic sulfonic acid and phosphorus pentoxide as described above.

In the embodiment specified in Item (ii-1), the poly (arylene ether ketone) resin (B) can be obtained in such a manner that, for example, the monomer represented by general formula (3-2) is allowed to react with isophthaloyl chloride and terephthaloyl chloride in the presence of the Lewis acid catalyst.

As a more preferable embodiment of the production method specified in Item (ii-1), the following method is cited: (ii-2) a method for producing the poly(arylene ether ketone) resin, the method including a reaction step of allowing the monomer represented by general formula (3-2) to react with isophthaloyl chloride and terephthaloyl chloride in the presence of the Lewis acid catalyst to obtain the poly(arylene ether ketone) resin (B) and allowing the poly (arylene ether ketone) resin (B) to react in the presence of a mixture of the organic sulfonic acid and phosphorus pentoxide.

Herein, as an example of the Lewis acid catalyst, aluminium chloride anhydrous is cited.

The PAEK resin (B) may be obtained in such a manner that, for example, 1,2-dichlorobenzene is used as a solvent and 1,2-dichlorobenzene, isophthaloyl chloride, and terephthaloyl chloride are allowed to react with the monomer represented by general formula (3-2) in the presence of the Lewis acid catalyst.

In the embodiment specified in Item (ii-2), the mixing ratio of the monomer represented by general formula (3-2) to isophthaloyl chloride to terephthaloyl chloride is not particularly limited, can be appropriately selected depending on purposes, and is preferably, for example, 100:10:90 to 100:50:50 on a molar basis.

In a case where 1,2-dichlorobenzene is used as a solvent, the ratio of the loading of 1,2-dichlorobenzene to the sum of the loadings of the monomer represented by general formula (3-2), isophthaloyl chloride, and terephthaloyl chloride is not particularly limited, can be appropriately selected depending on purposes, and is preferably in the range of, for example, 100:1 to 100:20 on a mass basis.

The ratio of the loading of the PAEK resin (B) to the sum of the loadings of the organic sulfonic acid and phosphorus pentoxide is not particularly limited, can be appropriately selected depending on purposes, and is preferably in the range of, for example, 25:100 to 1:100 on a mass basis.

Conditions for allowing the monomer represented by general formula (3-2) to react with isophthaloyl chloride and terephthaloyl chloride in the presence of the Lewis acid catalyst are not particularly limited and can be appropriately selected depending on purposes. The PAEK resin (B) can be produced in such a manner that, for example, the monomer represented by general formula (3-2), isophthaloyl chloride, and terephthaloyl chloride are cooled to, for example, −10° C. to 0° C. under a nitrogen atmosphere; the Lewis acid catalyst is added, is uniformly dissolved, and is gradually heated; and reaction is carried out at a temperature of 20° C. to 40° C. for one hour to 100 hours.

The amounts of components such as the organic sulfonic acid and phosphorus pentoxide, the ratio thereof, the loading of the PAEK resin (B), the ratio of the PAEK resin (B) to the organic sulfonic acid to phosphorus pentoxide, reaction conditions (the reaction temperature, the reaction time, and the like) for allowing the PAEK resin (B) in the presence of the organic sulfonic acid and phosphorus pentoxide, or the like are not particularly limited and may be appropriately set such that the concentration of the alkylsulfonyl group in the PAEK resin is in a preferable range.

The concentration of the alkylsulfonyl group represented by general formula (1) in the PAEK resin can be adjusted to a preferable range in such a manner that, for example, the ratio of the loading of a mixture of the organic sulfonic acid and phosphorus pentoxide to the loading of the PAEK resin (B) is set higher or the reaction temperature and reaction time for allowing the PAEK resin (B) to react in the presence of the mixture of the organic sulfonic acid and phosphorus pentoxide is sufficiently ensured.

In, for example, the production method according to the embodiment specified in Item (ii-2), the alkylsulfonyl group can be introduced into the PAEK resin in such a manner that the PAEK resin (B) obtained from the monomer represented by general formula (3-2) is allowed to react for 70° C. to 120° C. for one hour to ten hours in the presence of a mixture of the organic sulfonic acid and phosphorus pentoxide.

In particular, as a more preferable embodiment of the production method according to the embodiment specified in Item (ii-2), a production method specified in Item (ii-3) below can be cited.

(ii-3) A method for producing the poly(arylene ether ketone) resin according to the present invention in such a manner that, after the PAEK resin (B) is obtained by allowing the monomer represented by general formula (3-2) to react with 1,2-dichlorobenzene, isophthaloyl chloride, and terephthaloyl chloride in the presence of a Lewis acid catalyst such as aluminium chloride anhydrous, the obtained PAEK resin (B) is allowed to react at a temperature of 70° C. to 120° C. for one hour to ten hours in the presence of a mixture of the organic sulfonic acid and phosphorus pentoxide.

According to the production method specified in Item (ii-3), the amount of the alkylsulfonyl group, represented by general formula (1), introduced into the PAEK resin can be set to a preferable range.

(Resin Composition Containing Poly(Arylene Ether Ketone) Resin (PAEK Resin))

A resin composition can be prepared by combining the poly(arylene ether ketone) resin according to the present invention with another blend.

The other blend is not particularly limited and can be appropriately selected depending on purposes. For example, an inorganic filler, an organic filler, and the like are cited.

The shape of a filler is not particularly limited. For example, a particulate filler, a plate-like filler, a fibrous filler, and the like are cited.

The resin composition, which contains the PAEK resin according to the present invention, preferably contains a fibrous filler as a filler.

As examples of the fibrous filler, an inorganic fiber and an organic fiber are cited.

As examples of the inorganic fiber, the following fibers can be cited: inorganic fibers such as carbon fibers, glass fibers, boron fibers, alumina fibers, and silicon carbide fibers; carbon fibers; activated carbon fibers; graphite fibers; glass fibers; tungsten carbide fibers; silicon carbide fibers (silicon carbide fibers); ceramic fibers; alumina fibers; natural fibers; mineral fibers such as basalt; boron fibers; boron nitride fibers; boron carbide fibers; metal fibers; and the like. As examples of the metal fibers, aluminium fibers, copper fibers, brass fibers, stainless steel fibers, steel fibers, and the like can be cited.

As examples of the organic fiber, the following fibers are cited: synthetic fibers made of resin materials such as polybenzazole, aramid, PBO (poly(paraphenylene benzoxazole)), poly(phenylene sulfide), polyester, acryl, polyamide, polyolefin, poly(vinyl alcohol), and polyallylate; natural fibers such as cellulose, wool, and silk; reclaimed fibers such as protein, polypeptide, and alginic acid; and the like.

Among fibrous fillers, the carbon fibers and the glass fibers have wide industrial uses and are therefore preferable. The fibrous fillers may be used alone or in combination.

The form of fibers may be a cluster of fibers, one in which fibers are continuous, one in which fibers are discontinuous, a woven fabric, or a nonwoven fabric. The form of fibers may be a fiber bundle in which fibers are arranged in one direction or a sheet in which fiber bundles are arranged. The form of fibers may be a three-dimensional form formed by thickening a cluster of fibers.

A method for hybridizing the PAEK resin according to the present invention with a filler is not particularly limited and may be a known common method. The PAEK resin according to the present invention can be hybridized with the filler by, for example, a method such as kneading, application, impregnation, injection, or pressure bonding.

The resin composition, which contains the PAEK resin according to the present invention, may be blended with a solvent depending on uses.

As an example of the solvent, an organic solvent is cited. As examples of the organic solvent, the following compounds are cited: methyl ethyl ketone, acetone, ethyl acetate, butyl acetate, toluene, dimethylformamide, methyl isobutyl ketone, methoxypropanol, cyclohexanone, methyl cellosolve, ethylene glycol acetate, propylene glycol monomethyl ether acetate, and the like. The type and adequate usage of the solvent can be appropriately selected depending on uses.

The resin composition, which contains the PAEK resin according to the present invention, may be blended with various resins other than the PAEK resin according to the present invention, a reactive compound, a catalyst, a polymerization initiator, an inorganic pigment, an organic pigment, an extender pigment, a clay mineral, wax, a surfactant, a stabilizer, a flow modifier, a coupling agent, dye, a leveling agent, a rheology control agent, an ultraviolet absorber, an oxidation inhibitor, a plasticizer, and the like.

(Molded Article Containing Poly(Arylene Ether Ketone) Resin (PAEK Resin))

The poly(arylene ether ketone) resin according to the present invention is excellent in heat resistance and has a high glass transition temperature (Tg) and good molding processability. The crystalline melting point (Tm) thereof can be controlled with high crystallinity maintained. Therefore, the poly(arylene ether ketone) resin can be used as a neat resin or can be used as a compound for glass fibers, carbon fibers, fluorocarbon resins, and the like. Molding the PAEK resin according to the present invention enables primary processed products such as rods, boards, films, and filaments; various injection molding products; various cutting products; and secondary processed products such as gears, bearings, composites, implants, and 3D molded articles to be manufactured. Molded articles obtained by molding the PAEK resin according to the present invention can be used for cars, airplanes, electric/electronic members, medical members, and the like.

In particular, at a high temperature 390° C. or higher the PAEK resin according to the present invention can inhibit reaction such as crosslinking between a phenyl group and a ketone group in a main chain structure, can prevent the gelation of resin, and is excellent in melt stability; hence, a good molded article can be obtained.

EXAMPLES

The present invention is further described below in detail with reference to examples. The scope of the present invention is not limited to the examples.

(Glass Transition Temperature (Tg (° C.)) and Crystalline Melting Point (Tm (° C.)))

Measurement was performed from 40° C. to 400° C. at a nitrogen flow rate of 50 mL/min and a heating rate of 20° C./min using a DSC system, Pyris Diamond, manufactured by Perkin Elmer, whereby the glass transition temperature (Tg) and the crystalline melting point (Tm) were determined.

(5% Weight Loss Temperature (Td5 (° C.))

Measurement was performed at a nitrogen flow rate of 20 mL/min and a heating rate of 20° C./min using a TG-DTA system, TG-8120, manufactured by Rigaku Corporation, whereby the 5% weight loss temperature was determined.

(Melt Viscosity (Pa·s))

After the melting temperature was set 40° C. higher than the melting point and a load of $1.96\times10^6$ Pa was maintained at L/D=10/1 for six minutes, the melt viscosity (Pa·s) was measured using a flow tester system, CFT-500C, manufactured by Shimadzu Corporation.

(Thickening Ratio)

After the melting temperature was set 40° C. higher than the melting point and a load of $1.96\times10^6$ Pa was maintained at L/D=10/1 for six minutes and after a load of $1.96\times10^6$ Pa was maintained for 30 minutes, the melt viscosity (Pa·s) was measured using a flow tester system, CFT-500C, manufactured by Shimadzu Corporation, followed by calculating the thickening ratio by the following equation:

thickening ratio=$V30/V6$ where V30 represents the melt viscosity measured after maintaining for 30 minutes and V6 represents the melt viscosity measured after maintaining for six minutes.

(Concentration of Alkylsulfonyl Group)

Five parts by volume of nitric acid was mixed with 0.25 parts of resin and the resin was degraded by microwave irradiation, followed by dilution to 25 parts with ion-exchanged water. Nitric acid comparable to that used to degrade the resin was added to a sulfate ion standard solution for chemical analysis, whereby six samples, having a concentration of 0 ppm, 50 ppm, 100 ppm, 500 ppm, 1,000 ppm, and 3,000 ppm, for calibration curve preparation were prepared. The samples were measured using an ICP-OES system, Optima 8300, manufactured by Perkin Elmer, followed by preparing a calibration curve. Thereafter, a sample solution containing a degradation product of the resin was measured, followed by calculating the concentration of an alkylsulfonyl group from the concentration of sulfur atoms.

(Analysis of Terminal Structure)

A solution, containing an equal weight mixture of deuterated solvents, that is, deuterated trifluoroacetic acid and deuterated chloroform, having a sample concentration of 60 mg/ml was measured by $^1$H-NMR with a number of scans of 16 using an NMR system, JNM-ECZ 400S, manufactured by JOEL.

Example 1

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 50.9 g of 1,4-diphenoxybenzene and 49.1 g of 4,4'-oxybis(benzoic acid) were added, followed by heating to 60° C. and then carrying out reaction at this temperature for 20 hours. Furthermore, after heating to 100° C., reaction was carried out at this temperature for two hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 1 was obtained.

The obtained polymer was measured by $^1$H-NMR, so that it could be confirmed that a methanesulfonyl group was bonded to a terminal structure below (S=3.27, s, 3H).

[Chem. 17]

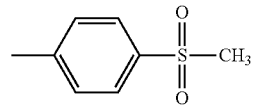

The glass transition temperature (Tg), crystalline melting point (Tm), 5% weight loss temperature (Td5), melt viscosity, and thickening ratio of the PAEK resin according to Example 1 were measured. The results were shown in Table 1.

Example 2

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 40.2 g of diphenyl ether and 59.8 g of 4,4'-oxybis (benzoic acid) were added, followed by heating to 60° C. and then carrying out reaction at this temperature for 20 hours. Furthermore, after heating to 100° C., reaction was carried out at this temperature for two hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 2 was obtained.

The glass transition temperature (Tg), crystalline melting point (Tm), 5% weight loss temperature (Td5), melt viscosity, and thickening ratio of the PAEK resin according to Example 2 were measured. The results were shown in Table 1.

Example 3

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 43.3 g of 1,4-diphenoxybenzene and 56.7 g of 1,4-bis(4-carboxyphenoxy)benzene were added, followed by heating to 60° C. and then carrying out reaction at this temperature for 20 hours. Furthermore, after heating to 100°

C., reaction was carried out at this temperature for two hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 3 was obtained.

The glass transition temperature (Tg), crystalline melting point (Tm), 5% weight loss temperature (Td5), melt viscosity, and thickening ratio of the PAEK resin according to Example 3 were measured. The results were shown in Table 1.

Example 4

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 50.9 g of 1,4-diphenoxybenzene and 49.1 g of 4,4'-oxybis(benzoic acid) were added, followed by heating to 60° C. and then carrying out reaction at this temperature for 20 hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 4 was obtained.

The glass transition temperature (Tg), crystalline melting point (Tm), 5% weight loss temperature (Td5), melt viscosity, and thickening ratio of the PAEK resin according to Example 4 were measured. The results were shown in Table 1.

Example 5

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 50.9 g of 1,4-diphenoxybenzene and 49.1 g of 4,4'-oxybis(benzoic acid) were added, followed by heating to 60° C. and then carrying out reaction at this temperature for 60 hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 5 was obtained.

The glass transition temperature (Tg), crystalline melting point (Tm), 5% weight loss temperature (Td5), melt viscosity, and thickening ratio of the PAEK resin according to Example 5 were measured. The results were shown in Table 1.

Example 6

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 50.9 g of 1,4-diphenoxybenzene and 49.1 g of 4,4'-oxybis(benzoic acid) were added, followed by heating to 60° C. and then carrying out reaction at this temperature for 20 hours. Furthermore, after heating to 80° C., reaction was carried out at this temperature for two hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 6 was obtained.

The glass transition temperature (Tg), crystalline melting point (Tm), 5% weight loss temperature (Td5), melt viscosity, and thickening ratio of the PAEK resin according to Example 6 were measured. The results were shown in Table 2.

Example 7

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 50.9 g of 1,4-diphenoxybenzene and 49.1 g of 4,4'-oxybis(benzoic acid) were added, followed by heating to 60° C. and then carrying out reaction at this temperature for ten hours. Furthermore, after heating to 100° C., reaction was carried out at this temperature for four hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 7 was obtained.

The glass transition temperature (Tg), crystalline melting point (Tm), 5% weight loss temperature (Td5), melt viscosity, and thickening ratio of the PAEK resin according to Example 7 were measured. The results were shown in Table 2.

Example 8

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 50.9 g of 1,4-diphenoxybenzene and 49.1 g of 4,4'-oxybis(benzoic acid) were added, followed by heating to 60° C. and then carrying out reaction at this temperature for 20 hours. Furthermore, after heating to 120° C., reaction was carried out at this temperature for two hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 8 was obtained.

The glass transition temperature (Tg), crystalline melting point (Tm), 5% weight loss temperature (Td5), melt viscosity, and thickening ratio of the PAEK resin according to Example 8 were measured. The results were shown in Table 2.

Example 9

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 50.9 g of 1,4-diphenoxybenzene and 49.1 g of 4,4'-oxybis(benzoic acid) were added, followed by heating to 100° C. and then carrying out reaction at this temperature for 20 hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 9 was obtained.

The glass transition temperature (Tg), crystalline melting point (Tm), 5% weight loss temperature (Td5), melt viscosity, and thickening ratio of the PAEK resin according to Example 9 were measured. The results were shown in Table 2.

Example 10

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 50.9 g of 1,4-diphenoxybenzene and 49.1 g of 4,4'-oxybis(benzoic acid) were added, followed by heating to 120° C. and then carrying out reaction at this temperature for 20 hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 10 was obtained.

The glass transition temperature (Tg), crystalline melting point (Tm), 5% weight loss temperature (Td5), melt viscosity, and thickening ratio of the PAEK resin according to Example 10 were measured. The results were shown in Table 2.

Example 11

Into a four-necked separable flask equipped with a nitrogen inlet tube, a thermometer, a reflux condenser, and a stirrer, 864 g of 1,2-dichlorobenzene, 5.4 g of isophthaloyl chloride, 21.6 g of terephthaloyl chloride, and 23.0 g of diphenyl ether were charged, followed by cooling to −5° C. under a nitrogen atmosphere. Thereafter, 86 g of aluminium chloride anhydrous was added and was homogenized, followed by heating to 30° C. over two hours and then carrying out reaction at this temperature for 50 hours. Methanol was added in small amounts to a reaction solution while the reaction solution was being strongly stirred, whereby a particulate polymer was precipitated. The precipitated polymer was filtered.

Furthermore, the precipitated polymer was cleaned with methanol twice. Next, the precipitated polymer was cleaned with ion-exchanged water twice. Thereafter, solid-liquid separation was carried out and a filtered cleaned cake was dried at 180° C. for ten hours in a vacuum, whereby a polymer was obtained.

Into a four-necked separable flask equipped with a nitrogen inlet tube, a thermometer, a reflux condenser, and a stirrer, 327 g of methanesulfonic acid and 33 g of phosphorus pentoxide were charged, followed by stirring at room temperature for 20 hours under a nitrogen atmosphere. Thereafter, 40 g of the polymer obtained as described above was added, followed by heating to 100° C. and then carrying out reaction at this temperature for five hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 11 was obtained.

The glass transition temperature (Tg), crystalline melting point (Tm), 5% weight loss temperature (Td5), melt viscosity, and thickening ratio of the PAEK resin according to Example 11 were measured. The results were shown in Table 3.

Example 12

Into a four-necked separable flask equipped with a nitrogen inlet tube, a thermometer, a reflux condenser, and a stirrer, 864 g of 1,2-dichlorobenzene, 4.3 g of isophthaloyl chloride, 17.3 g of terephthaloyl chloride, and 28.4 g of 1,4-diphenoxybenzene were charged, followed by cooling to −5° C. under a nitrogen atmosphere. Thereafter, 86 g of aluminium chloride anhydrous was added and was homogenized, followed by heating to 30° C. over two hours and then carrying out reaction at this temperature for 50 hours. Methanol was added in small amounts to a reaction solution while the reaction solution was being strongly stirred, whereby a particulate polymer was precipitated. The precipitated polymer was filtered.

Furthermore, the precipitated polymer was cleaned with methanol twice. Next, the precipitated polymer was cleaned with ion-exchanged water twice. Thereafter, solid-liquid separation was carried out and a filtered cleaned cake was dried at 180° C. for ten hours in a vacuum, whereby a polymer was obtained.

Into a four-necked separable flask equipped with a nitrogen inlet tube, a thermometer, a reflux condenser, and a stirrer, 327 g of methanesulfonic acid and 33 g of phosphorus pentoxide were charged, followed by stirring at room temperature for 20 hours under a nitrogen atmosphere. Thereafter, 40 g of the polymer obtained as described above was added, followed by heating to 100° C. and then carrying out reaction at this temperature for five hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 12 was obtained.

The glass transition temperature (Tg), crystalline melting point (Tm), 5% weight loss temperature (Td5), melt viscosity, and thickening ratio of the PAEK resin according to Example 12 were measured. The results were shown in Table 3.

Example 13

Into a four-necked separable flask equipped with a nitrogen inlet tube, a thermometer, a reflux condenser, and a stirrer, 864 g of 1,2-dichlorobenzene, 4.3 g of isophthaloyl chloride, 17.3 g of terephthaloyl chloride, and 28.4 g of 1,4-diphenoxybenzene were charged, followed by cooling to −5° C. under a nitrogen atmosphere. Thereafter, 86 g of aluminium chloride anhydrous was added and was homogenized, followed by heating to 30° C. over two hours and then carrying out reaction at this temperature for 50 hours. Methanol was added in small amounts to a reaction solution while the reaction solution was being strongly stirred, whereby a particulate polymer was precipitated. The precipitated polymer was filtered.

Furthermore, the precipitated polymer was cleaned with methanol twice. Next, the precipitated polymer was cleaned with ion-exchanged water twice. Thereafter, solid-liquid separation was carried out and a filtered cleaned cake was dried at 180° C. for ten hours in a vacuum, whereby a polymer was obtained.

Into a four-necked separable flask equipped with a nitrogen inlet tube, a thermometer, a reflux condenser, and a stirrer, 327 g of ethanesulfonic acid and 33 g of phosphorus pentoxide were charged, followed by stirring at room temperature for 20 hours under a nitrogen atmosphere. Thereafter, 40 g of the polymer obtained as described above was added, followed by heating to 100° C. and then carrying out reaction at this temperature for five hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Example 13 was obtained.

The obtained polymer was measured by $^1$H-NMR, so that it was confirmed that an ethanesulfonyl group was bonded to a terminal structure below (δ=3.17, m, 2H, δ=1.42, m, 3H).

[Chem. 18]

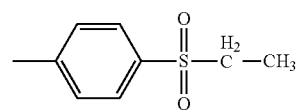

The glass transition temperature (Tg), crystalline melting point (Tm), 5% weight loss temperature (Td5), melt viscosity, and thickening ratio of the PAEK resin according to Example 13 were measured. The results were shown in Table 3.

Comparative Example 1

Into a four-necked separable flask equipped with a nitrogen inlet tube, a thermometer, a reflux condenser, and a stirrer, 864 g of 1,2-dichlorobenzene, 5.4 g of isophthaloyl chloride, 21.6 g of terephthaloyl chloride, and 23.0 g of diphenyl ether were charged, followed by cooling to −5° C. under a nitrogen atmosphere. Thereafter, 86 g of aluminium chloride anhydrous was added and was homogenized, followed by heating to 30° C. over two hours and then carrying out reaction at this temperature for 50 hours. Methanol was added in small amounts to a reaction solution while the reaction solution was being strongly stirred, whereby a particulate polymer was precipitated. The precipitated polymer was filtered. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Comparative Example 1 was obtained.

The glass transition temperature (Tg), crystalline melting point (Tm), 5% weight loss temperature (Td5), melt viscosity, and thickening ratio of the PAEK resin according to Comparative Example 1 were measured. The results were shown in Table 4.

Comparative Example 2

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 1.66 g of methoxybenzene, 50.3 g of 1,4-diphenoxybenzene, and 49.5 g of 4,4'-oxybis(benzoic acid) were added, followed by heating to 60° C. and then carrying out reaction at this temperature for 20 hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Comparative Example 2 was obtained.

The obtained polymer was measured by $^1$H-NMR, so that it was confirmed that a methoxy group was bonded to a terminal structure below (S=3.74, s, 3H).

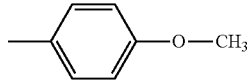

[Chem. 19]

The glass transition temperature (Tg), crystalline melting point (Tm), 5% weight loss temperature (Td5), melt viscosity, and thickening ratio of the PAEK resin according to Comparative Example 2 were measured. The results were shown in Table 4.

Comparative Example 3

Into a four-necked separable flask equipped with a nitrogen inlet tube, a thermometer, a reflux condenser, and a stirrer, 818 g of methanesulfonic acid and 82 g of phosphorus pentoxide were charged, followed by stirring at room temperature for 20 hours under a nitrogen atmosphere. Thereafter, 1.41 g of methylbenzene, 50.3 g of 1,4-diphenoxybenzene, and 49.5 g of 4,4'-oxybis(benzoic acid) were added, followed by heating to 60° C. and then carrying out reaction at this temperature for 20 hours. Thereafter, a reaction solution was cooled to room temperature and methanol was added in small amounts to the reaction solution while the reaction solution was being strongly stirred, whereby a particulate polymer was precipitated. The precipitated polymer was filtered.

The filtration residue was subjected to a Soxhlet extractor and was extraction-cleaned for 40 hours in such a manner that hot methanol was refluxed. Furthermore, the filtration residue was extraction-cleaned for 40 hours in such a manner that hot water was refluxed. Thereafter, solid-liquid separation was carried out and a filtered cleaned cake was dried at 180° C. for ten hours in a vacuum, whereby a polymer of Comparative Example 3 was obtained.

The obtained polymer was measured by $^1$H-NMR, so that it was confirmed that a methyl group was bonded to a terminal structure below (δ=2.34, s, 3H).

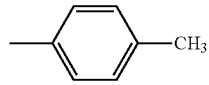

[Chem. 20]

The glass transition temperature (Tg), crystalline melting point (Tm), 5% weight loss temperature (Td5), melt viscosity, and thickening ratio of the PAEK resin according to Comparative Example 3 were measured. The results were shown in Table 4.

The type of an alkylsulfonyl group bonded to a terminal site of the PAEK resin in each example is listed in Tables 1 to 3 below. The type of a group bonded to a terminal site of the PAEK resin in each comparative example is listed in Table 4 below.

A measurement result of the concentration (mmol/kg) of an alkylsulfonyl group in the PAEK resin in each of the examples and the comparative examples is listed in Tables 1 to 4.

The value of n in general formula (3-1) and the value of m in general formula (4-1) when a main chain structure of the PAEK resin in each of the examples and the comparative examples is represented by general formula (2) are listed in Tables 1 to 4.

TABLE 1

| Physical properties | | Example 1 Methanesulfonyl group | Example 2 Methanesulfonyl group | Example 3 Methanesulfonyl group | Example 4 Methanesulfonyl group | Example 5 Methanesulfonyl group |
|---|---|---|---|---|---|---|
| Terminal structure | Type | | | | | |
| Concentration of alkylsulfonyl group | mmol/kg | 22 | 30 | 15 | 0.3 | 0.5 |
| Main chain structure | m | 1 | 1 | 2 | 1 | 1 |
| | n | 1 | 0 | 1 | 1 | 1 |
| Tg | ° C. | 150 | 153 | 143 | 149 | 150 |
| Tm | ° C. | 349 | 373 | 343 | 348 | 348 |
| Td5 | ° C. | 550 | 548 | 550 | 548 | 550 |
| Melt viscosity | Pa · s | 210 | 190 | 195 | 220 | 210 |
| Thickening ratio | | 1 | 1 | 1 | 1 | 1 |

| Physical properties | | Example 6 Methanesulfonyl group | Example 7 Methanesulfonyl group | Example 8 Methanesulfonyl group | Example 9 Methanesulfonyl group | Example 10 Methanesulfonyl group |
|---|---|---|---|---|---|---|
| Terminal structure | Type | | | | | |
| Concentration of alkylsulfonyl group | mmol/kg | 1 | 267 | 500 | 1010 | 1980 |
| Main chain structure | m | 1 | 1 | 1 | 1 | 1 |
| | n | 1 | 1 | 1 | 1 | 1 |
| Tg | °C. | 150 | 150 | 150 | 150 | 150 |
| Tm | °C. | 350 | 350 | 349 | 349 | 350 |
| Td5 | °C. | 551 | 550 | 549 | 539 | 535 |
| Melt viscosity | Pa·s | 201 | 200 | 199 | 134 | 98 |
| Thickening ratio | | | | | | |

TABLE 3

| Physical properties | | Example 11 | Example 12 | Example 13 |
|---|---|---|---|---|
| Terminal structure | Type | Methane-sulfonyl group | Methane-sulfonyl group | Ethane-sulfonyl group |
| Concentration of alkylsulfonyl group | mmol/kg | 150 | 220 | 75 |
| Main chain structure | m | 0 | 0 | 0 |
| | n | 0 | 1 | 1 |
| Tg | °C. | 165 | 160 | 160 |
| Tm | °C. | 369 | 350 | 350 |
| Td5 | °C. | 550 | 552 | 552 |
| Melt viscosity | Pa·s | 223 | 240 | 244 |
| Thickening ratio | | 1 | 1 | 1 |

TABLE 4

| Physical properties | | Comparative Example 1 None | Comparative Example 2 Methoxy group | Comparative Example 3 Methyl group |
|---|---|---|---|---|
| Terminal structure | Type | | | |
| Concentration of alkylsulfonyl group | mmol/kg | 0 | 0 | 0 |
| Main chain structure | m | 0 | 1 | 1 |
| | n | 0 | 1 | 1 |
| Tg | °C. | 165 | 149 | 149 |
| Tm | °C. | 369 | 348 | 349 |
| Td5 | °C. | 550 | 548 | 544 |
| Melt viscosity | Pa·s | 220 | 185 | 184 |
| Thickening ratio | | 2.5 | 3.4 | 2.8 |

The PAEK resins of Examples 1 to 13 are such that the thickening ratio, which is the ratio between the melt viscosity measured after six minutes to the melt viscosity measured after 30 minutes at a high temperature 40° C. higher than the melting point, can be set to 2 or less and can be preferably set to 1.2 or less.

That is, in each comparative example, the melt viscosity of the melted resin held for 30 minutes at a high temperature 40° C. higher than the melting point significantly increases to 2.5 times to 3.4 times that for six minutes. However, in each example, the melt viscosity measured after 30 minutes increases very little or is low, up to 1.8 times the melt viscosity measured after six minutes, showing that a PAEK resin according to the present invention is excellent in melt viscosity stability.

As described above, a PAEK resin according to the present invention is resin excellent in melt viscosity stability in a high-temperature molten state and therefore has good molding processability.

The invention claimed is:

1. A poly(arylene ether ketone) resin containing an alkylsulfonyl group represented by general formula (1) below:

(1)

where R is an alkyl group containing one to four carbon atoms, and having a main chain structure represented by general formula (2) below:

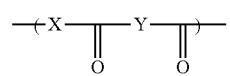
(2)

where X is represented by general formula (3-1) below and Y is represented by general formula (4-1) below:

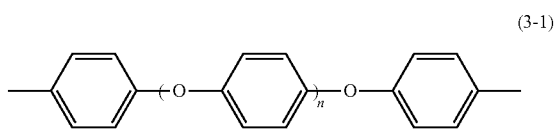
(3-1)

where n represents 0 to 2, and

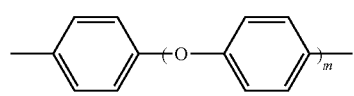
(4-1)

where m represents 0 to 3.

2. The poly(arylene ether ketone) resin according to claim 1, wherein the alkylsulfonyl group represented by general formula (1) is bonded to a terminal site of the poly(arylene ether ketone) resin and has a terminal structure represented by general formula (1A) below:

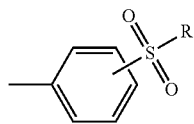

where R is an alkyl group containing one to four carbon atoms.

3. The poly(arylene ether ketone) resin according to claim 1, wherein the concentration of the alkylsulfonyl group represented by general formula (1) in the poly(arylene ether ketone) resin is 0.3 mmol/kg to 2,000 mmol/kg.

4. A method for producing a poly(arylene ether ketone) resin containing an alkylsulfonyl represented by general formula (1) below, the method comprising either:

(i) a reaction step of allowing a monomer represented by general formula (3-2) below and a monomer represented by general formula (4-2) below to react in the presence of a mixture of an organic sulfonic acid and phosphorus pentoxide or (ii) a reaction step of allowing a poly(arylene ether ketone) resin containing no alkylsulfonyl group to react in the presence of a mixture of an organic sulfonic acid and phosphorus pentoxide:

where R is an alkyl group containing one to four carbon atoms,

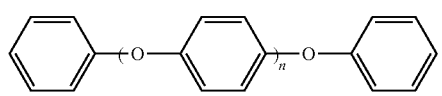

where n represents 0 to 2, and

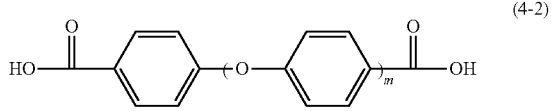

where m represents 0 to 3.

5. The method for producing the poly(arylene ether ketone) resin according to claim 4, wherein the reaction step (ii) is a reaction step of allowing the monomer represented by general formula (3-2) to react with isophthaloyl chloride and terephthaloyl chloride in the presence of a Lewis acid catalyst to obtain a poly(arylene ether ketone) resin (B) and allowing the poly(arylene ether ketone) resin (B) to react in the presence of a mixture of an organic sulfonic acid and phosphorus pentoxide.

6. A resin composition containing the poly(arylene ether ketone) resin according to claim 1.

7. The resin composition according to claim 6, further containing a fiber.

8. A molded article made by molding the resin composition according to claim 6.

9. The poly(arylene ether ketone) resin according to claim 2, wherein the concentration of the alkylsulfonyl group represented by general formula (1) in the poly(arylene ether ketone) resin is 0.3 mmol/kg to 2,000 mmol/kg.

10. A resin composition containing the poly(arylene ether ketone) resin according to claim 2.

11. A resin composition containing the poly(arylene ether ketone) resin according to claim 3.

12. The resin composition according to claim 10, further containing a fiber.

13. The resin composition according to claim 11, further containing a fiber.

14. A molded article made by molding the resin composition according to claim 10.

15. A molded article made by molding the resin composition according to claim 11.

16. A molded article made by molding the resin composition according to claim 13.

17. A molded article made by molding the resin composition according to claim 12.

\* \* \* \* \*